(12) United States Patent
Vanhilst

(10) Patent No.: US 6,963,832 B2
(45) Date of Patent: Nov. 8, 2005

(54) MEANING TOKEN DICTIONARY FOR AUTOMATIC SPEECH RECOGNITION

(75) Inventor: Michael Vanhilst, Aventura, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 580 days.

(21) Appl. No.: 09/974,645

(22) Filed: Oct. 9, 2001

(65) Prior Publication Data

US 2003/0069730 A1   Apr. 10, 2003

(51) Int. Cl.[7] ............................................. G10L 15/00
(52) U.S. Cl. ........................................ 704/9; 704/275
(58) Field of Search ............................ 704/9, 255, 275

(56) References Cited

U.S. PATENT DOCUMENTS

| | | | |
|---|---|---|---|
| 4,994,983 A | | 2/1991 | Landell et al. |
| 5,136,654 A | | 8/1992 | Ganong, III et al. |
| 5,577,165 A | * | 11/1996 | Takebayashi et al. ........ 704/275 |
| 5,642,519 A | * | 6/1997 | Martin ............................ 704/9 |
| 5,797,116 A | | 8/1998 | Yamada et al. |
| 6,018,708 A | | 1/2000 | Dahan et al. |
| 6,021,384 A | | 2/2000 | Gorin et al. |
| 6,122,361 A | | 9/2000 | Gupta |
| 6,253,170 B1 | | 6/2001 | Dolan |
| 6,631,346 B1 | * | 10/2003 | Karaorman et al. ............ 704/9 |
| 6,721,697 B1 | * | 4/2004 | Duan et al. ..................... 704/9 |

* cited by examiner

*Primary Examiner*—Daniel Abebe

(57) ABSTRACT

Systems and methods of automatic speech recognition are described. In one aspect, an automatic speech recognition system includes a speech recognition dictionary and a speech recognizer. The speech recognition dictionary includes a plurality of meaning tokens each associated with one or more pronunciations of one or more vocabulary words and signifying a single meaning. The speech recognizer is configured to convert spoken input into a sequence of meaning tokens contained in the speech recognition dictionary and corresponding to a sequence of vocabulary words most likely to have been spoken by a user.

23 Claims, 3 Drawing Sheets

US 6,963,832 B2

MEANING TOKEN DICTIONARY FOR AUTOMATIC SPEECH RECOGNITION

TECHNICAL FIELD

This invention relates to a meaning token dictionary for automatic speech recognition applications, including task-oriented speech recognition applications.

BACKGROUND

Most real-time automatic speech recognition systems include a speech recognizer and a natural language processor. The speech recognizer converts an incoming stream of sounds into a likely sequence of words. In particular, the speech recognizer receives digitized speech samples from an acoustic input device (e.g., a microphone), and converts the digitized speech samples into sequences of recognized words based upon finite state machine templates. The finite state machine templates are defined by a set of vocabulary word patterns, which are stored in a dictionary, and, possibly, a set of grammar rules. The natural language processor attempts to make sense of the word sequences that are output by the speech recognizer. That is, the natural language processor attempts to extract from each word sequence a meaning that is relevant to a specific user application. In a typical implementation, the natural language processor compares a word sequence with internal semantic patterns that are defined by a grammar compiler. The natural language processor identifies permissible sentences based upon the internal semantic patterns, and outputs summary structures representing permissible sentences. In task-oriented automatic speech recognition systems, an application command translator may match the summary structures with a known set of user application commands, and may return appropriate commands to a user application for processing.

Speech-enabled applications that understand normal spoken sentences often are difficult to implement and usually exhibit frequent recognition errors. In general, the process of automatically recognizing speech is made difficult by three primary obstacles. First, most words are short. With only a few sound features, a speech recognizer usually has difficulty in clearly distinguishing among similar sounding candidates. As a result, numerous incorrect hypotheses from the dictionary are likely to be passed on to the grammar process. Second, grammar processes that attempt to make fine distinctions among possible utterances are complicated, inefficient, and hard to write. Simpler grammars, on the other hand, allow many incorrect utterances that cannot be parsed (or interpreted) for meaning. Finally, even if a correct sentence is transcribed and output, natural language itself typically is ambiguous. Thus, the parsing process implemented by the user application often must test numerous hypotheses using complicated, non-deterministic methods to determine the correct meaning from a natural language input.

SUMMARY

The invention features systems and methods of automatic speech recognition in which the vocabulary words of a speech recognition dictionary correspond to meaning tokens each of which signifies a single meaning.

In one aspect, the invention features an automatic speech recognition system that comprises a speech recognition dictionary and a speech recognizer. The speech recognition dictionary comprises a plurality of meaning tokens each associated with one or more pronunciations of one or more vocabulary words and signifying a single meaning. The speech recognizer is configured to convert spoken input into a sequence of meaning tokens that are contained in the speech recognition dictionary and correspond to a sequence of vocabulary words that are most likely to have been spoken by a user.

Embodiments of the invention may include one or more of the following features.

Each meaning token preferably is characterized by a unique spelling. The spelling of a meaning token preferably facilitates extraction of meaning by a language analyzer. The spelling of a meaning token may encode one or more labels identifying one or more respective application-specific categories. An application-specific category that is identified by a label encoded in the spelling of a meaning token may be an object category, a place category, an event category, or an action category.

Multiple meaning tokens may be associated with each of one or more polysemous vocabulary words contained in the speech recognition dictionary.

The automatic speech recognition system may include a language analyzer that is configured to extract meaning from the sequence of meaning tokens provided by the speech recognizer based upon a set of task-specific semantic rules. The language analyzer may be a deterministic rule-based language analyzer. The automatic speech recognition system also may include an application command translator that is configured to select an action from a set of application-specific actions based upon the meaning extracted by the language analyzer, and to issue one or more commands to carry out the selected action.

The speech recognition dictionary preferably is a data structure that is stored in a computer-readable physical medium.

The invention also features an automatic speech recognition method in accordance with which spoken input is converted into a sequence of meaning tokens that are contained in a speech recognition dictionary and correspond to a sequence of vocabulary words that are most likely to have been spoken by a user. The speech recognition dictionary comprises a plurality of meaning tokens each associated with one or more pronunciations of one or more vocabulary words and signifying a single meaning.

The invention also features a computer program for automatically recognizing speech. The computer program resides on a computer-readable medium and comprises computer-readable instructions for causing a computer to convert spoken input into a sequence of meaning tokens that are contained in a speech recognition dictionary and corresponding to a sequence of vocabulary words that are most likely to have been spoken by a user. The speech recognition dictionary resides on the computer-readable medium and comprises a plurality of meaning tokens each associated with one or more pronunciations of one or more vocabulary words and signifying a single meaning.

Among the advantages of the invention are the following.

An automatic speech recognizer may function normally with respect to the inventive meaning token dictionary. In particular, the invention readily may be incorporated into existing automatic speech recognition systems in which the dictionaries may be manipulated or replaced. The output from the speech recognizer, however, is in the form of meaning tokens rather than simple transcriptions of ordinary spoken words. The inventive meaning token dictionary may simplify the work that must be performed by the language analyzer and any downstream application program that uses an automatic speech recognition system for spoken language input. In addition, the output from the speech recognition system may be substantially free of ambiguities, allowing the downstream application program to use deterministic interpretation algorithms (which are simpler and more efficient than non-deterministic algorithms).

Because the meaning tokens may have longer pronunciations than ordinary words, more data may be used to distinguish words in the speech recognition dictionary. In this way, the invention enables the speech recognition system to recognize each word with greater precision, resulting in higher overall recognition accuracy. In addition, since there may be fewer word candidates with pronunciations that are similar enough to the sound input, there may be fewer hypotheses to test against the grammar, increasing the efficiency of the automatic speech recognition process.

The grammars that may be used with the invention also may be much simpler than grammars that, for example, must account for all combinations of words. For example, idiomatic and context dependent word combinations, such as "go for it" or "look it up," may be handled in the inventive meaning token dictionary rather than in the grammar.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
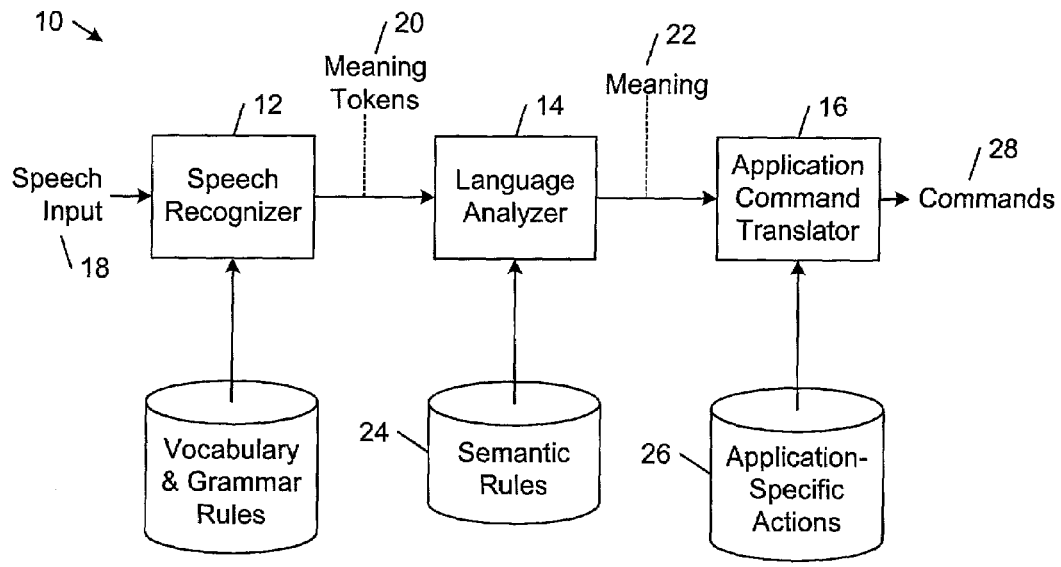
FIG. 1 is a block diagram of an automatic speech recognition system that includes a speech recognizer, a language analyzer, and an application command translator.

Referring to FIG. 1, in one embodiment, an automatic speech recognition system 10 includes a speech recognizer 12, a language analyzer 14, and an application command translator 16. In operation, speech recognizer 12 converts an incoming stream of speech sounds 18 (or utterances) into a likely sequence of meaning tokens 20. In particular, speech recognizer 12 receives digitized speech samples from an acoustic input device (e.g., a microphone; not shown), and converts the digitized speech samples into sequences of recognized meaning tokens based upon finite state machine templates. The finite state machine templates are defined by a set of vocabulary meaning token patterns, which are stored in a meaning token dictionary. In some embodiments, the finite state machine templates also are defined by a set of grammar rules. Language analyzer 14 may be implemented as a conventional deterministic rule-based language analyzer. Language analyzer 14 attempts to make sense of the meaning token sequences 20 that are output by speech recognizer 12. That is, language analyzer 14 attempts to extract from each meaning token sequence a meaning 22 that is relevant to a specific user application. In a typical implementation, language analyzer 14 compares a meaning token sequence with a set of semantic rules 24 that are defined by a grammar compiler. Language analyzer 14 identifies permissible meanings based upon the semantic rules, and outputs summary structures representing permissible sentences. Application command translator 16 matches the summary structures with one of a set of application-specific actions 26, and carries out the selected action by issuing one or more commands 28 to a downstream user application for processing.

As explained in detail below, speech recognizer 12 may be a conventional automatic speech recognition system that operates with respect to the meaning token dictionary in the same way that it would operate with respect to a conventional speech recognition dictionary. The output from the speech recognizer 12, however, is in the form of meaning tokens rather than simple transcriptions of ordinary spoken words. The meaning token dictionary may simplify the work that must be performed by language analyzer 14 and any downstream application program that uses an automatic speech recognition system for spoken language input. In addition, the output from speech recognizer 12 may be substantially free of ambiguities, allowing language analyzer 14 and the downstream application program to use deterministic interpretation algorithms (which are simpler and more efficient than non-deterministic algorithms).

Figure 2:
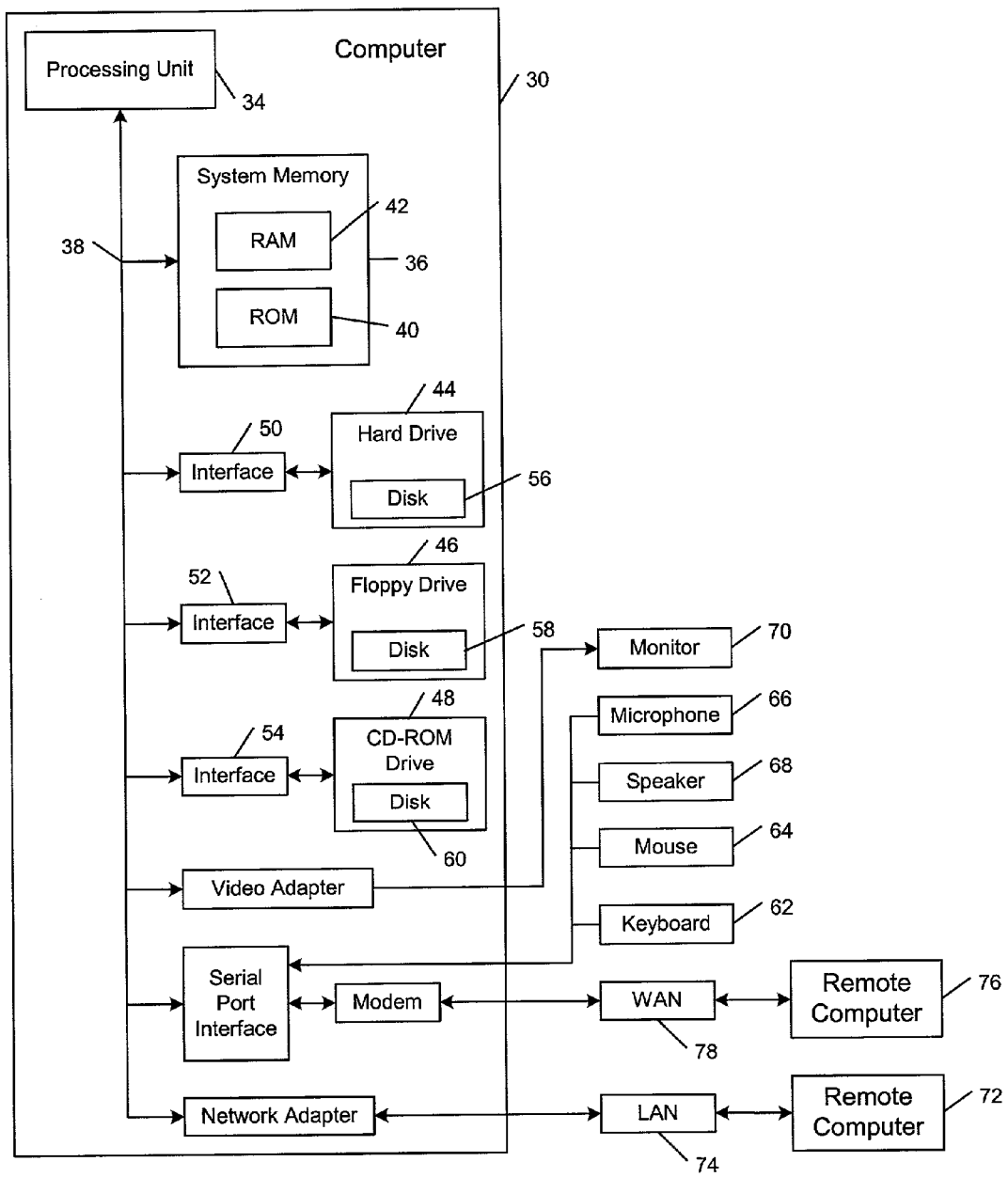
FIG. 2 is a block diagram of a computer on which the automatic speech recognition system of FIG. 1 may be implemented.

Referring to FIG. 2, in one embodiment, automatic speech recognition system 10 may be implemented as one or more respective software modules operating on a general-purpose computer 30. Computer 30 includes a processing unit 34, a system memory 36, and a system bus 38 that couples processing unit 34 to the various components of computer 30. Processing unit 34 may include one or more processors, each of which may be in the form of any one of various commercially available processors. System memory 36 includes a read only memory (ROM) 40 that stores a basic input/output system (BIOS) containing start-up routines for computer 30, and a random access memory (RAM) 42. System bus 38 may be a memory bus, a peripheral bus or a local bus, and may be compatible with any of a variety of bus protocols, including PCI, VESA, Microchannel, ISA, and EISA. Computer 30 also includes a hard drive 44, a floppy drive 46, and CD ROM drive 48 that are connected to system bus 38 by respective interfaces 50, 52, 54. Hard drive 44, floppy drive 46, and CD ROM drive 48 contain respective computer-readable media disks 56, 58, 60 that provide non-volatile or persistent storage for data, data structures and computer-executable instructions. Other computer-readable storage devices (e.g., magnetic tape drives, flash memory devices, and digital video disks) also may be used with computer 30. A user may interact (e.g., enter commands or data) with computer 40 using a keyboard 62 and a mouse 64. A user also may interact with automatic speech recognition system 10, which is executing on computer 30, by speaking into a microphone 66. Computer 30 may output synthesized speech and other sounds through a speaker 68. Information may be displayed to the user on a monitor 70. Computer 30 also may include peripheral output devices, such as a printer. One or more remote computers 72 may be connected to computer 30 over a local area network (LAN) 74, and one or more remote computers 76 may be connected to computer 30 over a wide area network (WAN) 78 (e.g., the Internet).

Figure 3:
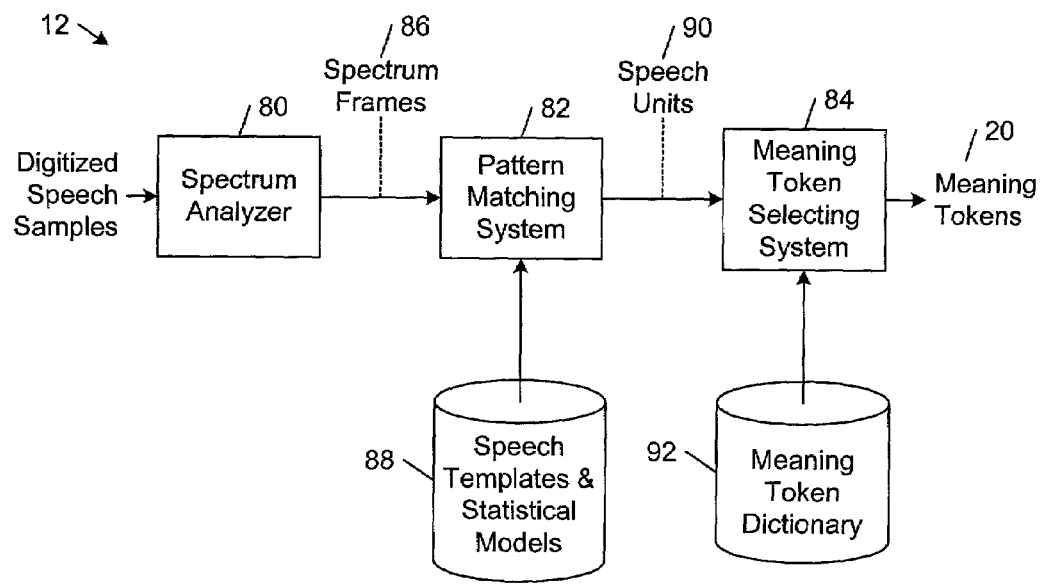
FIG. 3 is a block diagram of the speech recognizer of FIG. 1.

Referring to FIG. 3, in one embodiment, speech recognizer 12 includes a spectrum analyzer 80, a pattern matching system 82, and a meaning token selecting system 84. Spectrum analyzer 80 operates on the digitized speech samples that are received from the acoustic input device to compute a sequence of spectrum frames 86. Pattern matching system 82 establishes a correspondence between the sequence of spectrum frames 86 and pre-stored (trained) representations of speech sounds 88, and produces a sequence of speech units 90. Meaning token selecting system 84 assembles the speech units 90 into sets of possible pronunciations and selects from a meaning token dictionary 92 a sequence of recognized meaning tokens 20 corresponding to a sequence of vocabulary words mostly likely to have been spoken by a user.

Figure 4:
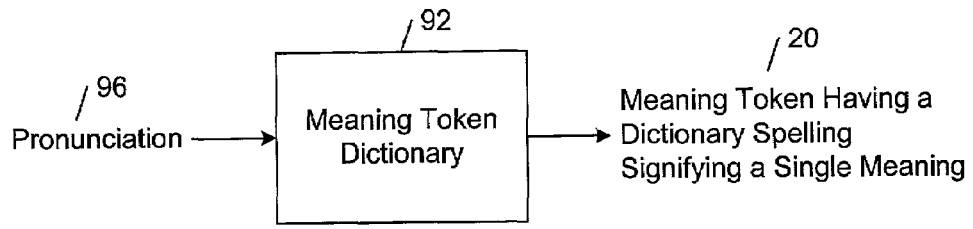
FIG. 4 is a block diagram of a meaning token dictionary associating a pronunciation with a meaning token having dictionary spelling signifying a single meaning.
Figure 5:
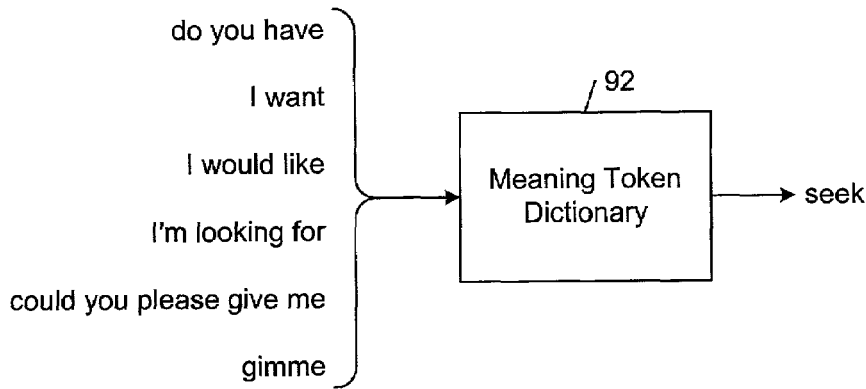
FIG. 5 is a block diagram of a meaning token dictionary associating multiple pronunciations with a single meaning token.

As shown in FIGS. 4 and 5, meaning token dictionary 92 maps a pronunciation 96 to a meaning token 20 having a dictionary spelling that signifies a single meaning (or thought or idea). As used herein the term "dictionary" refers broadly to a data structure that is stored on a computer-readable physical medium and contains vocabulary words that may be mapped onto a spoken utterance on the basis of acoustic characteristics and, possibly, a-priori probabilities or another rule, such as a linguistic model or a grammar model. Meaning token 20 may have the same pronunciation as a vocabulary word in a conventional speech recognition dictionary, but the dictionary spelling that is associated with that vocabulary word is selected to signify a single meaning rather than a simple transcription of the words that were spoken. For example, the pronunciation of "do you have" could be the pronunciation for a meaning token that is spelled "seek". The same meaning token also may be associated with many different pronunciations. For example, "seek" could also be the dictionary spelling for the pronunciations of "I want", "I would like", "I'm looking for", "could you please give me", and "gimme".

Figure 6:
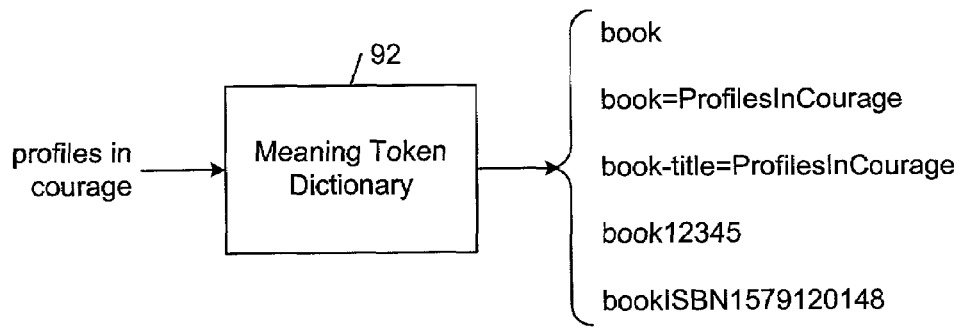
FIG. 6 is a block diagram of a meaning token dictionary associating a single pronunciation with one of multiple possible meaning tokens.

Referring to FIG. 6, in some embodiments, the spelling of a meaning token may encode various kinds of information that may be used by language analyzer 14 or a downstream application program. In some embodiments, a meaning token may encode one or more labels identifying one or more respective application-specific categories, such as an object category, a place category, an event category, or an action category. For example, book titles may appear in meaning token dictionary 92 for a meaning token "book", which may include the title or some other identifier. In the example of FIG. 6, the pronunciation "profiles in courage" could be spelled "book", "book=ProfilesInCourage", "book 12345", or "bookISBN1579120148". Similarly, the spelling of the "seek" meaning token could be "action=seek". In this case, if a user says to the application "Do you have Profiles in Courage?", speech recognizer 12 might output the two-token sequence "action=seek book=ProfilesInCourage," rather than the ambiguous six word sequence "do you have profiles in courage".

In some embodiments, meaning tokens may have longer spellings than the corresponding vocabulary words that are contained in a conventional speech recognition dictionary. Thus, each vocabulary word that is contained in the meaning token dictionary may have a unique spelling. In addition, multiple meaning tokens may be associated with each of one or more polysemous vocabulary words that are contained in the meaning token dictionary. In this way, language analyzer 14 and any downstream application program may easily distinguish each vocabulary word output by speech recognizer 12, resulting in higher overall recognition accuracy.

Systems and methods have been described herein in connection with a particular automatic speech recognition environment. These systems and methods, however, are not limited to any particular hardware or software configuration, but rather they may be implemented in any computing or processing environment, including in digital electronic circuitry or in computer hardware, firmware or software. In general, the components of the automatic speech recognition systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims.

What is claimed is:

1. An automatic speech recognition system, comprising:
   a speech recognition dictionary comprising a plurality of meaning tokens, wherein a single meaning token has a same meaning associated with plural different spoken words that have different pronunciations but similar spoken meanings; and
   a speech recognizer configured to convert spoken input into a sequence of meaning tokens contained in the speech recognition dictionary and corresponding to a sequence of vocabulary words most likely to have been spoken by a user, wherein different spoken inputs having different spoken words but similar meanings are converted into a same meaning token or same sequence of meaning tokens, and wherein at least one meaning token encodes one or more labels identifying one or more respective application-specific categories for use by an application program.

2. The system of claim 1, wherein each meaning token is characterized by a unique spelling.

3. The system of claim 2, wherein the spelling of a meaning token facilitates extraction of meaning by a language analyzer.

4. The system of claim 3, wherein the spelling of a meaning token encodes the one or more labels identifying one or more respective application-specific categories.

5. The system of claim 4, wherein an application-specific category identified by a label encoded in the spelling of a meaning token is an object category, a place category, an event category, or an action category.

6. The system of claim 1, wherein multiple meaning tokens are associated with each of one or more polysemous vocabulary words contained in the speech recognition dictionary.

7. The system of claim 1, further comprising a language analyzer configured to extract meaning from the sequence of meaning tokens provided by the speech recognizer based upon a set of task-specific semantic rules.

8. The system of claim 7, wherein the language analyzer is a deterministic rule-based language analyzer.

9. The system of claim 7, further comprising an application command translator configured to select an action from a set of application-specific actions based upon the meaning extracted by the language analyzer, and to issue one or more commands to carry out the selected action.

10. The system of claim 1, wherein the speech recognition dictionary is a data structure stored in a computer-readable physical medium.

11. The system of claim 1, wherein the plural different spoken words include different phrases of words.

12. An automatic speech recognition method, comprising:
converting spoken input into a sequence of meaning tokens contained in a speech recognition dictionary and corresponding to a sequence of vocabulary words most likely to have been spoken by a user,
wherein the speech recognition dictionary comprises a plurality of meaning tokens, and a single meaning token has a same meaning associated with plural different spoken words that have different pronunciations but similar spoken meanings such that different spoken inputs having different spoken words but similar spoken meanings are converted into a same meaning token or same sequence of meaning tokens, and wherein at least one meaning token encodes one or more labels identifying one or more respective application-specific categories for use by an application program.

13. The method of claim 12, wherein each meaning token is characterized by a unique spelling.

14. The method of claim 13, wherein the spelling of a meaning token facilitates extraction of meaning by a language analyzer.

15. The method of claim 14, wherein the spelling of a meaning token encodes the one or more labels identifying one or more respective application-specific categories.

16. The method of claim 15, wherein an application-specific category identified by a label encoded in the spelling of a meaning token is an object category, a place category, an event category, or an action category.

17. The method of claim 12, wherein multiple meaning tokens are associated with each of one or more polysemous vocabulary words contained in the speech recognition dictionary.

18. The method of claim 12, further comprising extracting meaning from the sequence of meaning tokens based upon a set of task-specific semantic rules.

19. The method of claim 18, further comprising selecting an action from a set of application-specific actions based upon the extracted meaning.

20. The method of claim 19, further comprising issuing one or more commands to carry out the selected action.

21. The method of claim 12, wherein the plural different spoken words include different phrases of words.

22. A computer program for automatically recognizing speech, the computer program residing on a computer-readable medium and comprising computer-readable instructions for causing a computer to:
convert spoken input into a sequence of meaning tokens contained in a speech recognition dictionary and corresponding to a sequence of vocabulary words most likely to have been spoken by a user,
wherein the speech recognition dictionary resides on the computer-readable medium and comprises a plurality of meaning tokens, and a single meaning token has a same meaning associated with plural different spoken words that have different pronunciations but similar spoken meanings such that different spoken inputs having different spoken words but similar spoken meanings are converted into a same meaning token or same sequence of meaning tokens, and wherein at least one meaning token encodes one or more labels identifying one or more respective application-specific categories for use by an application program.

23. The computer program of claim 22, wherein the plural different spoken words include different phrases of words.

* * * * *